UNITED STATES PATENT OFFICE.

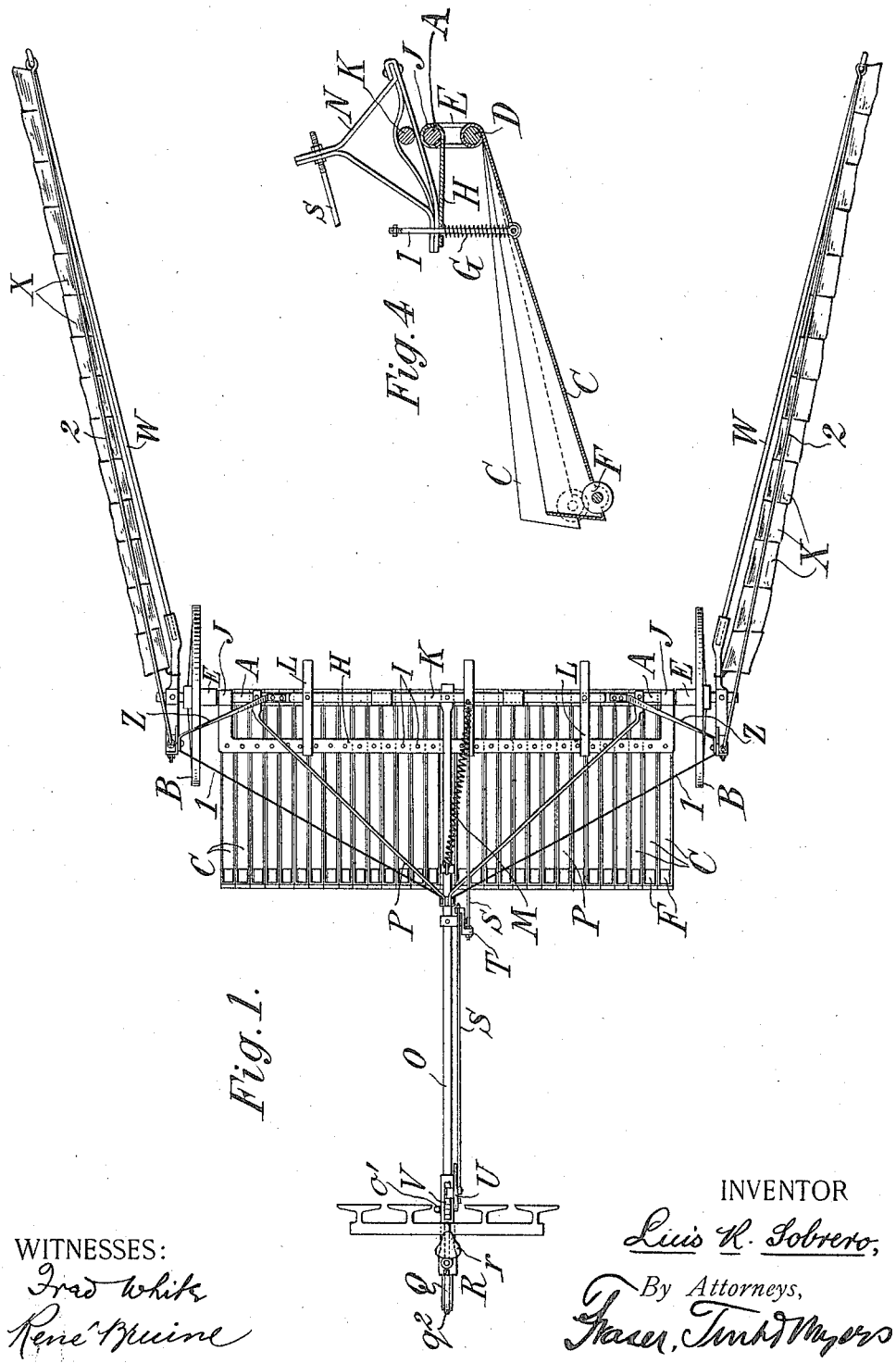

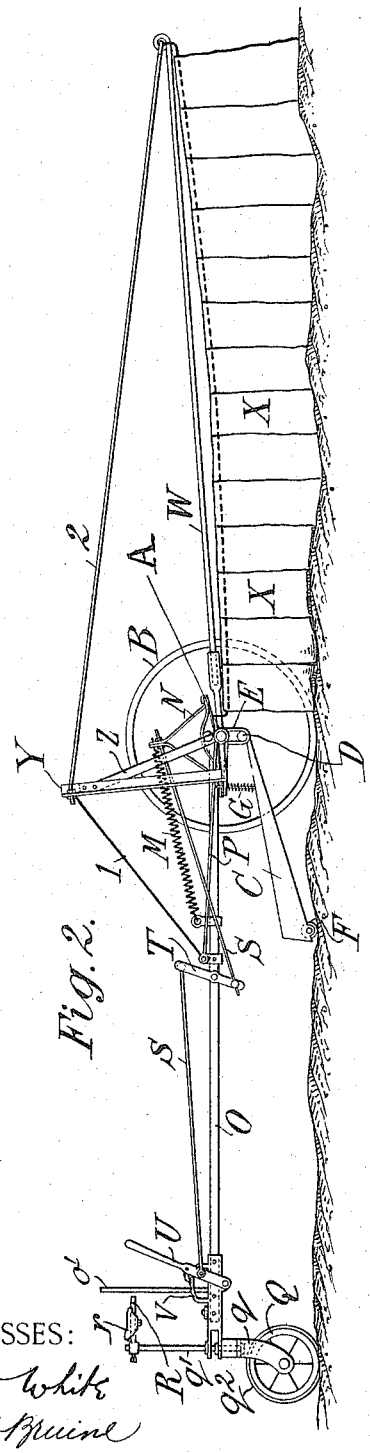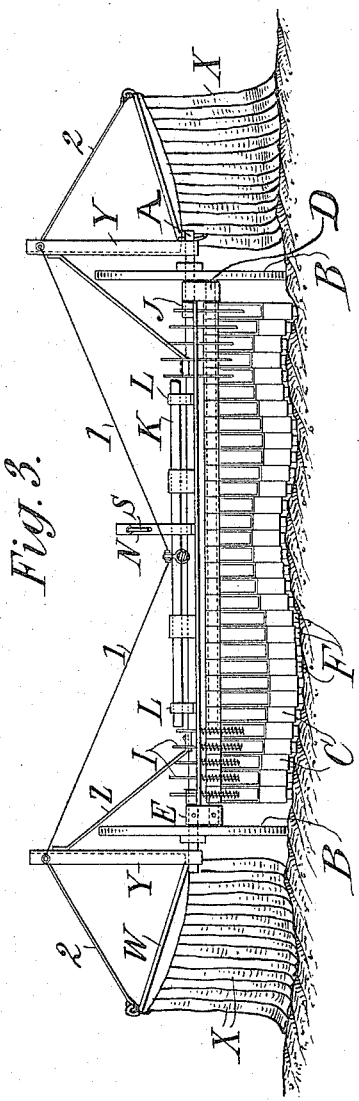

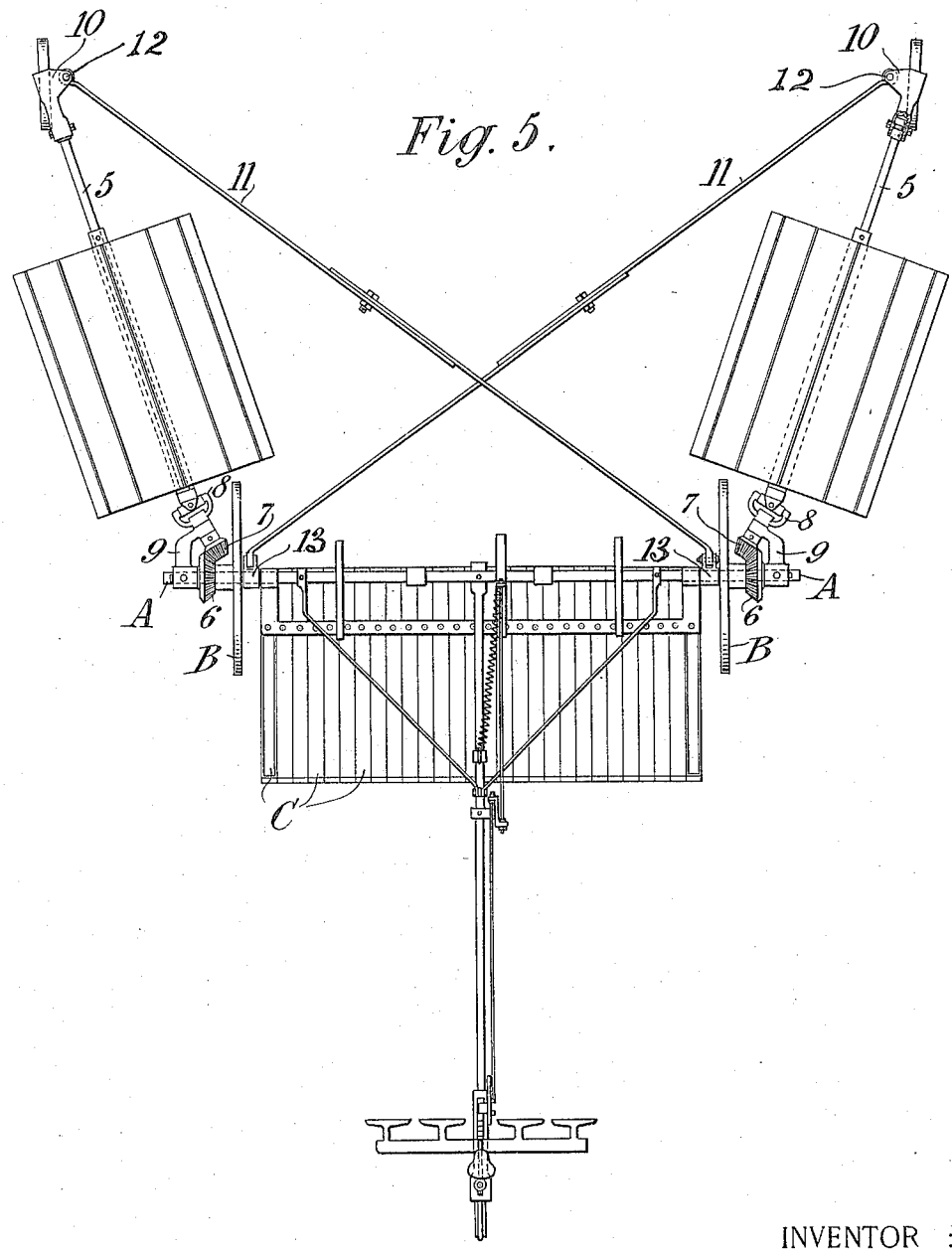

LUIS R. SOBRERO, OF NEW YORK, N. Y.

LOCUST-DESTROYER.

1,164,231.  Specification of Letters Patent.  Patented Dec. 14, 1915.

Application filed March 20, 1911. Serial No. 615,757.

*To all whom it may concern:*

Be it known that I, LUIS R. SOBRERO, a citizen of the Argentine Republic, residing in the city of New York, borough of Manhattan, county and State of New York, have invented certain new and useful Improvements in Locust-Destroyers, of which the following is a full, clear, and exact specification.

This invention relates to devices for destroying insects and more especially to devices for destroying locusts and aims to provide certain improvements therein.

Locusts travel in swarms upon the ground and it is the object of the present invention to provide a device adapted to be propelled over the ground and to crush the locusts upon the ground as it passes over them.

The invention further includes means adapted to drive the locusts in front of the device, and incorporates features adapting it to effective use over irregular ground and for adjustment of the crushing effect of the crushing devices.

An embodiment of the invention is illustrated in the accompanying drawings, reference to which will be had in describing the invention.

In said drawings, Figure 1 is a top plan view of the device; Fig. 2 is a side elevation of the device with parts of the machine on the near side thereof omitted for perspicuity; Fig. 3 is a rear elevation of the device, illustrating the manner in which the crushing elements adjust themselves to irregularities of the ground; Fig. 4 is a view illustrating the details of the crushing elements or trailers and certain parts of the means for producing pressure upon the trailers; Fig. 5 is a view similar to Fig. 1 (with parts omitted) illustrating a different form of means for driving the locusts in front of the machine.

In said drawings A represents a cross beam, preferably of considerable length, upon the ends of which are journaled the wheels B—B, upon which the device is preferably mounted. The cross beam and wheels constitute a carriage. Upon this carriage are mounted suitable devices capable of adjusting themselves to irregularities of the surface of the ground over which the device is moved, and as here shown comprising a plurality of crushing elements C in the form of trailers adapted to be dragged or trailed over the surface of the ground, These trailers C are preferably pivotally or movably attached to a transverse bar D hung from the beam A by means of hangers or brackets E. The trailers may be of any suitable form and preferably have rollers F at their ends which come in contact with the ground. The crushing force of the trailers C may be derived from their own weight or preferably from springs G bearing upon the upper faces of the trailers and upon the under-side of a bracket bar H attached to the cross beam A. Passing through the coils of the spring G are rods I attached to either the trailers or brackets H (here shown as attached to the trailers) and passing through guides in one of the other parts whereby said springs are retained in place and said trailers and rods may have movement relative to said bracket H.

Means are preferably provided for adjusting the pressure upon the said trailers. As here shown this is provided by pivotally mounting the bracket H upon the cross beam A, as at J, J, mounting upon the cross beam A a rock-shaft K having arms L, L bearing upon the upper side of said bracket H and connecting the rock-shaft with suitable means for rocking it and fixing it in its adjusted positions. For this purpose, a lever-arm N may be provided upon the rock-shaft and connected through suitable connecting rods S, S and lever T to a hand lever U upon the rear end of the pole O accessible to the driver. The hand lever may be fixed in its adjusted position by well known means, such as the pawl and rack engagement V as shown.

A spring M may be provided for normally pressing the arms L, L of the rock-shaft into engagement upon the upper side of the bracket H, the pressure upon the bracket being adjusted by augmenting or decreasing the pressure of said spring M. Spring M may be connected at one end to the lever arm N upon the rock-shaft and at its other end to a fixed part of the device, such as pole O.

Pole O, to which horses for propelling the device may be hitched, is connected to the cross beam A and preferably projects to the rear of the device. It is also preferably braced by rods P connected at their ends to the pole and cross beam A. The device may, however, be propelled by other than animal power.

A steering wheel Q mounted in a pivoted fork $q$ is preferably provided at the end of pole O. The fork $q$ is preferably provided with a stem $q'$ which is preferably prolonged and has attached thereto a lever-arm R. The lever arm R may be straddled by the driver and may be moved by movements of his body or legs. A seat $r$ for the driver may be provided upon the lever arm R, and a staff $o'$ fixed upon the pole O may be provided which the driver may grasp to steady himself. The lever arm R is also preferably made adjustable lengthwise of the stem to suit drivers of different statue. A rib $q^2$ may be provided upon the tread of the steering wheel to enable it to retain a firm grip or hold upon the ground in its steering movements. I also prefer to employ means for driving the locusts in front of the trailers. Such driving means may be in the form of means designed to scare the locusts into the path of the crushing elements, or may be in the form of means designed to sweep or physically remove the locusts into the path of the machine, or, in fact any suitable means designed to operate to this end. In Figs. 1, 2 and 3, are illustrated means to drive the locusts into the path of the machine by frightening or scaring them. In this embodiment arms W, of considerable length, are provided projecting in front of the device and preferably also diverging considerably to the sides. The extent to which these arms project to the side, or their divergence may be readily varied, and, in the embodiment under consideration, most conveniently by bending the arms W. From the arms are suspended flags or the like, preferably of fabric, which act to scare the insects into the path traversed by the device. These flags by making them sufficiently long to drag upon the ground, may also act to sweep or brush the insects into the path of the device. The arms W, W are preferably attached to the cross beam A and preferably beyond the wheels. The arms W, W are provided at their inner ends with upright arms Y, Y which are braced on the cross beam A by suitable rods Z, Z and to the pole O by suitable guys 1, 1. The projecting ends of the arms W, W are also preferably braced by the guys 2, 2 attached to the ends of the arms and to the uprights Y, Y.

In Fig. 5 of the drawing is illustrated an embodiment wherein the locusts are driven into the path of the machine by means designed to sweep them into the path of the machine. In this embodiment rotating shafts 5, 5 project in front of the machine, preferably also projecting considerably to the side. The shafts are rotated from the wheels B, B through suitable gears 6 and 7. The gears 6 are connected to the wheels, and gears 7 are connected to the shafts 5 through stub-shafts and universal joints 8, in order that the shafts may be adjusted laterally and may also be capable of movement in a vertical plane. The stub-shafts are journaled in brackets 9 fixed to the cross beam A on which the wheels are journaled. The shafts 5 are provided with any suitable sweeper or brush, which is preferably formed of a plurality of flexible sheets, such as leather, fixed to the shaft and rotating with it. The outer ends of the shafts are preferably supported upon the wheeled supports 10, 10 in which they are journaled, while the inner ends of shafts 5 are connected with the stub-shafts of gears 7 through universal joints, whereby the shafts are free to follow the vertical irregularities in the ground. The supports 10, are preferably braced from the machine by rods 11, 11. Rods 11 are movably attached to the supports 10 by joints 12, 12, having a vertical axis and movably attached to the cross beam A of the machine, as by knuckle joints 13, 13 having a horizontal axis, in such manner that rising and falling movements of the wheeled supports are permitted, but the supports braced against movement around the axis of the shafts 5. These rods 11 are preferably made adjustable in order that the angle at which the shafts 5 project toward the side or their divergence, may be adjusted.

The device is propelled over ground infested with the insects which it is sought to destroy. The driving devices projecting forwardly from the device drive the insects, by scaring or sweeping or otherwise, toward the center, where the insects pass under the suspended ends of the trailers or crushing elements and are confined until passed over by the ends of the trailers, or the rollers at the ends of the trailers which drag upon the ground, crushing and mashing the life out of the insects. The pressure of the rollers upon the ground can be regulated by the hand lever U, as hereinbefore described. The trailers being independently mounted may move independently of one another and thereby adjust themselves to the irregularities of the ground cross-wise of the device. By this means the trailers bear with crushing force upon all parts of the path traversed by the device, whatever may be the irregularities thereof and assuring the destruction of all insects upon the ground.

While I have shown and described one form of my invention it is not to be understood that the invention is limited thereto, as many changes and modifications may be made in the invention without departing from the spirit or scope thereof.

I claim as my invention:—

1. In a device of the character described the combination of a carriage having means for sustaining the weight thereof as it is hauled over the ground, and a multiplicity of independently movable narrow crushing elements attached to an elevated part of said carriage and extending into contact with the ground over which said elements are adapted to drag for the purpose of crushing insects, and over which said elements are adapted to adjust themselves to both transverse and longitudinal irregularities, said elements being adapted to bear on the ground in an unbroken line and being arranged so close together between their point of attachment and the ground as to form a row of impediments through which the insects cannot escape.

2. In a device of the character described the combination of a carriage having means for sustaining the weight thereof as it is hauled over the ground, and a multiplicity of independently movable narrow crushing elements attached to an elevated part of said carriage and extending into contact with the ground over which said elements are adapted to drag for the purpose of crushing insects, and over which said elements are adapted to adjust themselves to both transverse and longitudinal irregularities, said elements having small wheels at their extremities, said elements being adapted to bear on the ground in an unbroken line and being arranged so close together between their point of attachment and the ground as to form a row of impediments through which the insects cannot escape.

3. In a device of the character described the combination of a carriage having means for sustaining the weight thereof as it is hauled over the ground, and a multiplicity of independently movable narrow crushing elements attached to an elevated part of said carriage and extending into contact with the ground over which said elements are adapted to drag for the purpose of crushing insects, and over which said elements are adapted to adjust themselves to both transverse and longitudinal irregularities, and means for producing pressure on said crushing elements, said elements being adapted to bear on the ground in an unbroken line and being arranged so close together between their point of attachment and the ground as to form a row of impediments through which the insects cannot escape.

4. In a device of the character described the combination of a carriage having means for sustaining the weight thereof as it is hauled over the ground, and a multiplicity of independently movable narrow crushing elements attached to an elevated part of said carriage and extending into contact with the ground over which said elements are adapted to drag for the purpose of crushing insects, and over which said elements are adapted to adjust themselves to both transverse and longitudinal irregularities, means for producing pressure on said crushing elements and means for varying the pressure applied to said crushing elements, said elements being adapted to bear on the ground in an unbroken line and being arranged so close together between their point of attachment and the ground as to form a row of impediments through which the insects cannot escape.

5. In a device of the character described the combination of a carriage having means for sustaining the weight thereof as it is hauled over the ground, and a multiplicity of independently movable narrow crushing elements attached to an elevated part of said carriage and extending into contact with the ground over which said elements are adapted to drag for the purpose of crushing insects, and over which said elements are adapted to adjust themselves to both transverse and longitudinal irregularities, and means for driving insects into the path of said crushing elements, said elements being adapted to bear on the ground in an unbroken line and being arranged so close together between their point of attachment and the ground as to form a row of impediments through which the insects cannot escape.

6. In a device of the character described the combination of a carriage having means for sustaining the weight thereof as it is hauled over the ground, and a multiplicity of independently movable narrow crushing elements attached to an elevated part of said carriage and extending into contact with the ground over which said elements are adapted to drag for the purpose of crushing insects, and over which said elements are adapted to adjust themselves to both transverse and longitudinal irregularities, and arms projecting forwardly from said device having means for driving insects into the path of said crushing elements, said elements being adapted to bear on the ground in an unbroken line and being arranged so close together between their point of attachment and the ground as to form a row of impediments through which the insects cannot escape.

7. In a device of the character described, the combination of a carriage having means for sustaining the weight thereof as it is hauled over the ground, a multiplicity of independently movable narrow crushing elements attached to said carriage and adapted to drag over the ground for the purpose of crushing insects and to adjust themselves to both transverse and longitudinal irregularities in the surface over which they pass, and springs between said carriage and crushing elements for producing pressure on said crushing elements, said elements being adapted to bear on the ground in an unbroken line and being arranged so close together between their point of attachment and the ground as to form a row of impediments through which the insects cannot escape.

8. In a device of the character described, the combination of a carriage having means for sustaining the weight thereof as it is hauled over the ground, a multiplicity of independently movable narrow crushing elements attached to said carriage and adapted to drag over the ground for the purpose of crushing insects and to adjust themselves to both transverse and longitudinal irregularities in the surface over which they pass, a bracket pivotally attached to said carriage, springs between said bracket and crushing elements, and means for adjusting the position of said bracket for adjusting the pressure on said crushing elements, said elements being adapted to bear on the ground in an unbroken line and being arranged so close together between their point of attachment and the ground as to form a row of impediments through which the insects cannot escape.

9. In a device of the character described, the combination of a carriage having means for sustaining the weight thereof as it is hauled over the ground, a multiplicity of independently movable narrow crushing elements attached to said carriage and adapted to drag over the ground for the purpose of crushing insects and to adjust themselves to both transverse and longitudinal irregularities in the surface over which they pass, springs between said carriage and crushing elements for producing pressure on said crushing elements, a bracket pivotally attached to said carriage, springs between said bracket and crushing elements, means for adjusting the position of said bracket for adjusting the pressure of said crushing elements, and means projecting forwardly from the sides of said device for driving insects into the path traversed by said device, said elements being adapted to bear on the ground in an unbroken line and being arranged so close together between their point of attachment and the ground as to form a row of impediments through which the insects cannot escape.

10. In a device of the character described the combination of a carriage having means for sustaining the weight thereof as it is hauled over the ground, and a multiplicity of independently movable narrow crushing elements attached to an elevated part of said carriage and extending into contact with the ground over which said elements are adapted to drag for the purpose of crushing insects, and over which said elements are adapted to adjust themselves to both transverse and longitudinal irregularities, and arms projecting forwardly from said device having means for brushing insects into the path of said crushing elements, said elements being adapted to bear on the ground in an unbroken line and being arranged so close together between their point of attachment and the ground as to form a row of impediments through which the insects cannot escape.

11. In a device of the character described the combination of a carriage having means for sustaining the weight thereof as it is hauled over the ground, and a multiplicity of independently movable narrow crushing elements attached to an elevated part of said carriage and extending into contact with the ground over which said elements are adapted to drag for the purpose of crushing insects, and over which said elements are adapted to adjust themselves to both transverse and longitudinal irregularities, and adjustable arms projecting forwardly from said device having means for driving insects into the path of said crushing elements, said elements being adapted to bear on the ground in an unbroken line and being arranged so close together between their point of attachment and the ground as to form a row of impediments through which the insects cannot escape.

12. In a device of the character described the combination of a carriage having means for sustaining the weight thereof as it is hauled over the ground, and a multiplicity of independently movable narrow crushing elements attached to an elevated part of said carriage and extending into contact with the ground over which said elements are adapted to drag for the purpose of crushing insects, and over which said elements are adapted to adjust themselves to both transverse and longitudinal irregularities, and rotating arms projecting forwardly from said device having brushes thereon for driving insects into the path of said crushing elements, said elements being adapted to bear on the ground in an unbroken line and being arranged so close together between their point of attachment and the ground as to form a row of impediments through which the insects cannot escape.

13. In a device of the character described, the combination of a wheeled-carriage, a multiplicity of independently movable narrow crushing elements arranged close together attached to said carriage and adapted to drag over the ground for the purpose of crushing insects and to adjust themselves to both transverse and longitudinal irregularities in the surface over which they pass, rotatable shafts connected to said carriage and the wheels thereof through gears and a universal joint, projecting forwardly from said device and having brushes thereon for brushing insects into the path of said crushing elements, and means for supporting the outer ends of said shafts.

14. In a device of the character described the combination of a carriage having means for sustaining the weight thereof as it is hauled over the ground, and a multiplicity of independently movable narrow crushing elements attached to an elevated part of said carriage and extending into contact with the ground over which said elements are adapted to drag for the purpose of crushing insects, and over which said elements are adapted to adjust themselves to both transverse and longitudinal irregularities, and rotating arms having brushes thereon for driving insects into the path of said crushing elements, said arms projecting forwardly and laterally from said device and being adjustable in a lateral direction, said elements being adapted to bear on the ground in an unbroken line and being arranged so close together between their point of attachment and the ground as to form a row of impediments through which the insects cannot escape.

In witness whereof, I have hereunto signed my name in the presence of two subscribing witnesses.

LUIS R. SOBRERO.

Witnesses:
GUSTAVE R. THOMPSON,
BENN JOSEF BRANDON.

Copies of this patent may be obtained for five cents each, by addressing the "Commissioner of Patents, Washington, D. C."